United States Patent
Kobayashi

[11] Patent Number: 6,050,912
[45] Date of Patent: Apr. 18, 2000

[54] CONTINUOUSLY VARIABLE TRANSMISSION THAT CHANGES AXIAL THURST BASED ON TRANSMISSION RATIO

[75] Inventor: Daisuke Kobayashi, Yokohama, Japan

[73] Assignee: Nissan Motor Co., Ltd., Yokohama, Japan

[21] Appl. No.: 09/000,032

[22] PCT Filed: Jul. 14, 1997

[86] PCT No.: PCT/JP97/02433

§ 371 Date: Jan. 20, 1998

§ 102(e) Date: Jan. 20, 1998

[87] PCT Pub. No.: WO98/02679

PCT Pub. Date: Jan. 22, 1998

[30] Foreign Application Priority Data

Jul. 16, 1996 [JP] Japan ..................... 8-186261

[51] Int. Cl.[7] .......................... F16H 59/00; F16H 61/00; F16H 63/00
[52] U.S. Cl. ............... 474/18; 474/28; 474/70
[58] Field of Search ................. 474/8, 11, 12, 474/17, 18, 28, 69, 70

[56] References Cited

U.S. PATENT DOCUMENTS

| | | | |
|---|---|---|---|
| 4,519,790 | 5/1985 | Yamamuro et al. | 474/18 |
| 5,259,272 | 11/1993 | Yamamoto et al. | |
| 5,427,579 | 6/1995 | Kanehara et al. | 474/28 |
| 5,649,876 | 7/1997 | Morishita | 474/28 |
| 5,720,692 | 2/1998 | Kashiwabara | 474/28 |
| 5,766,105 | 6/1998 | Fellows et al. | 474/28 |
| 5,776,028 | 7/1998 | Matsuda et al. | 474/28 |
| 5,871,411 | 2/1999 | Senger et al. | 474/28 |
| 5,888,168 | 3/1999 | Niiyama et al. | 474/28 |

FOREIGN PATENT DOCUMENTS

| | | |
|---|---|---|
| 0759518 | 2/1997 | European Pat. Off. . |
| 55-100443 | 7/1980 | Japan . |
| 63-42147 | 8/1988 | Japan . |
| 309071 | 6/1997 | Taiwan . |

*Primary Examiner*—David A. Bucci
*Assistant Examiner*—Matthew A. Kaness
*Attorney, Agent, or Firm*—Foley & Lardner

[57] ABSTRACT

A continuously variable transmission for an automotive vehicle comprises a drive pulley including axially first and second wheel counterparts which define therebetween a pulley groove. The first wheel counterpart of the drive pulley is axially movable under an axial thrust to decrease the width of the pulley groove. A driven pulley is provided including first and second wheel counterparts which define therebetween a pulley groove. The first wheel counterpart of the driven pulley is axially movable under an axial thrust to decrease the width of the pulley groove. An annular belt is passed on the drive and driven pulleys to drivingly connect the drive and driven pulleys. The belt is fitted in the pulley groove of each pulley, and includes a plurality of elements which are aligned along periphery of the belt. A control unit variably controls the width of the pulley groove in accordance with a transmission ratio based on an operating condition of the vehicle, and sets the axial thrust (Q) so that a value of (Q×r)/T increases as the transmission ratio becomes larger, in which T is a transmitted torque; and r is a passed-on radius of the belt on each pulley.

7 Claims, 12 Drawing Sheets

CONTINUOUSLY VARIABLE TRANSMISSION THAT CHANGES AXIAL THURST BASED ON TRANSMISSION RATIO

TECHNICAL FIELD

This invention relates to improvements in a continuously variable transmission of the type wherein a belt is passed on drive and driven pulleys to accomplish power transmission from the drive pulley to the driven pulley, more particularly to the improvements to prevent the belt from slipping relative to the pulleys.

BACKGROUND ART

Continuously variable transmissions of the type wherein a belt is passed on drive and driven pulleys have been proposed and put into practical use. The belt includes an endless (loop-shaped) steel belt or cylindrical ring which is formed by laminating a plurality of endless steel sheets. A plurality of steel elements are supported on the ring in a manner to be aligned along the periphery of the ring so that the adjacent ones are contactable with each other. Each pulley includes axially movable and fixed wheel counterparts which are coaxial with and face each other to define therebetween a pulley groove. The axially movable wheel counterpart is axially movable under an axial thrust of a controlled hydraulic pressure so as to change the width of the pulley groove. A clearance is formed between the adjacent elements of the belt owing to an initial clearance and extension of the steel band. This clearance causes the belt to slip relative to the belt. Such a slip is remarkable particularly at a low gear (large transmission ratio) and reaches to several % to several tens %. This slip of the belt cannot be suppressed under changing transmission ratio even if a predetermined axial thrust is applied to the movable wheel counterpart to put the belt between the movable and fixed wheel counterparts of the pulley under a pressure. As a result, the continuously variable transmissions of this type are degraded in durability and power transmission efficiency.

DISCLOSURE OF INVENTION

It is an object of the present invention to provide an improved continuously variable transmission which can overcome drawbacks encountered in conventional continuously variable transmissions of the type similar to that of the present invention.

Another object of the present invention is to provide an improved continuously variable transmission of the type wherein a belt is passed on drive and driven pulleys, which transmission can be effectively prevented from being lowered in durability and power transmission efficiency of the transmission.

A further object of the present invention is to provide an improved continuously variable transmission of the type wherein a belt is passed on drive and driven pulleys, which transmission can effectively and securely suppress the belt from making its slip relative to the pulley regardless of variation of a transmission ratio.

A continuously variable transmission of the present invention is for a vehicle and comprises, as shown in FIG. 14, a drive pulley 16 including axially first and second wheel counterparts which define therebetween a pulley groove. The first wheel counterpart of the drive pulley is axially movable under an axial thrust to decrease the width of the pulley groove. A driven pulley 26 is provided including first and second wheel counterparts which define therebetween a pulley groove. The first wheel counterpart of the driven pulley is axially movable under an axial thrust to decrease the width of the pulley groove. An annular belt 5 is passed on the drive and driven pulleys to drivingly connect the drive and driven pulleys. The belt is fitted in the pulley groove of each pulley. The belt includes a plurality of elements which are aligned along the periphery of the belt. A control unit is provided and configured to variably control the width of the pulley groove in accordance with a transmission ratio based on an operating condition of the vehicle under the action of shift control means 101, and set the axial thrust (Q) so that a value of $(Q \times r)/T$ increases as the transmission ratio becomes larger (gear becomes lower) under the action of thrust generating means 100, in which T is a transmitted torque; and r is a passed-on radius of the belt on each pulley.

According to the present invention, by virtue of the fact that the value of $(Q \times r)/T$ is set to increase as the transmission ratio becomes larger (gear becomes lower), the belt passed on the drive and driven pulleys can be effectively prevented from slipping relative to the pulley even at a relatively low gear (large transmission ratio), thus securing a high durability and a high power transmission efficiency of the continuously variable transmission.

Figure 1:
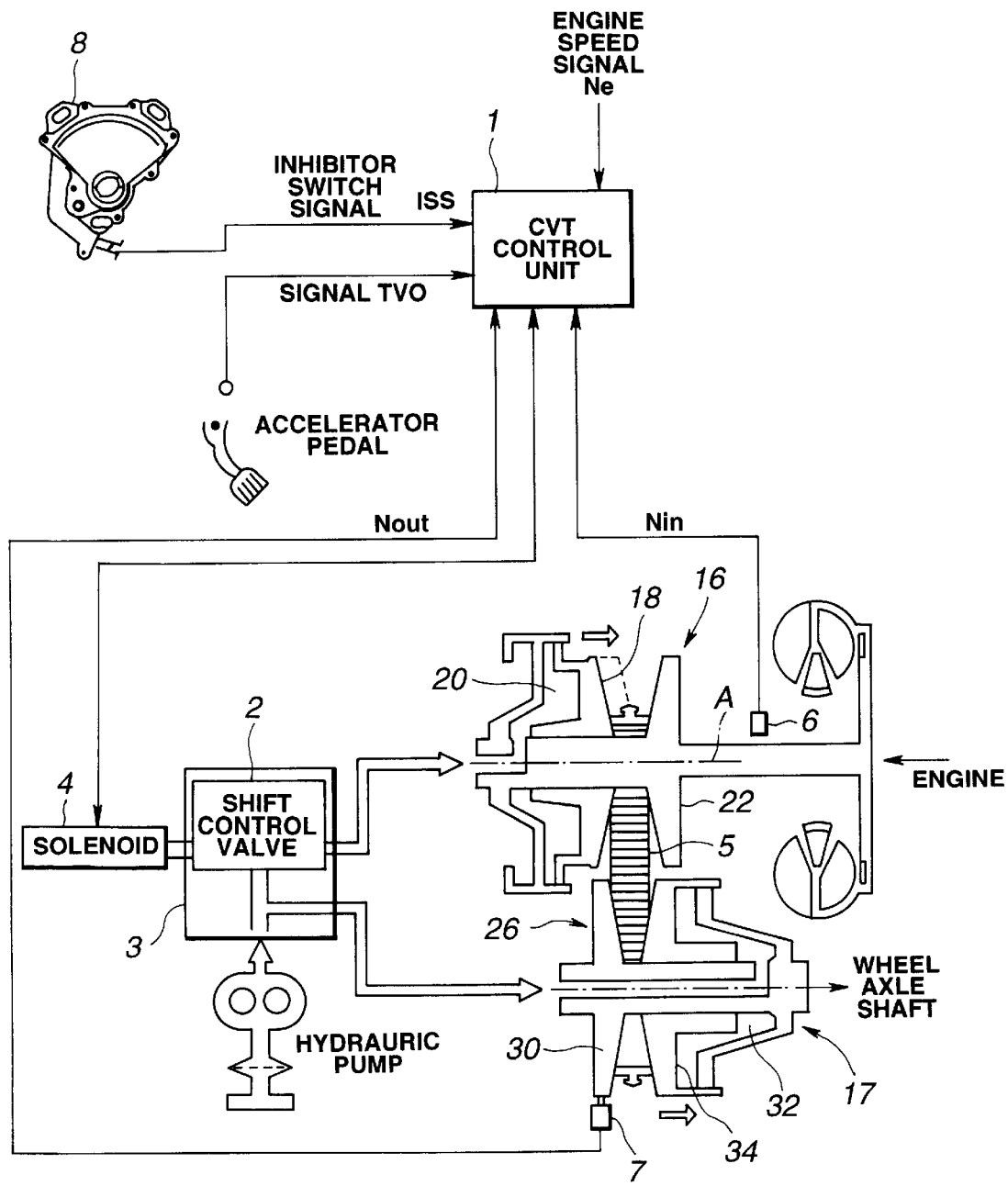
FIG. 1 is a schematic illustration of an embodiment of a continuously variable transmission according to the present invention.
Figure 5:
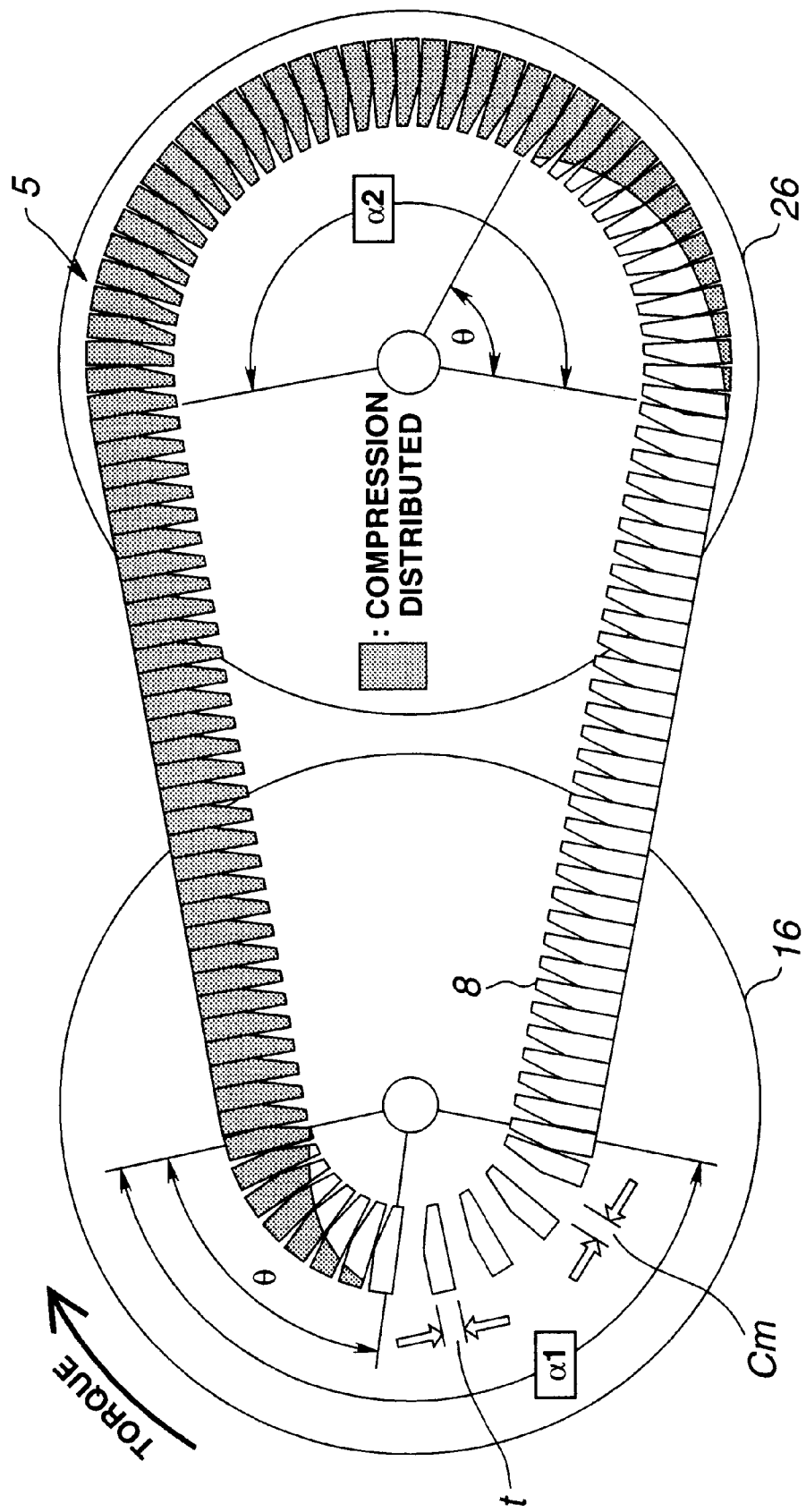
FIG. 5 is a schematic side view of an essential part of the conventional continuously variable transmission at a relatively low (large) transmission ratio, the essential part being common also to the transmission of FIG. 1.
Figure 11:
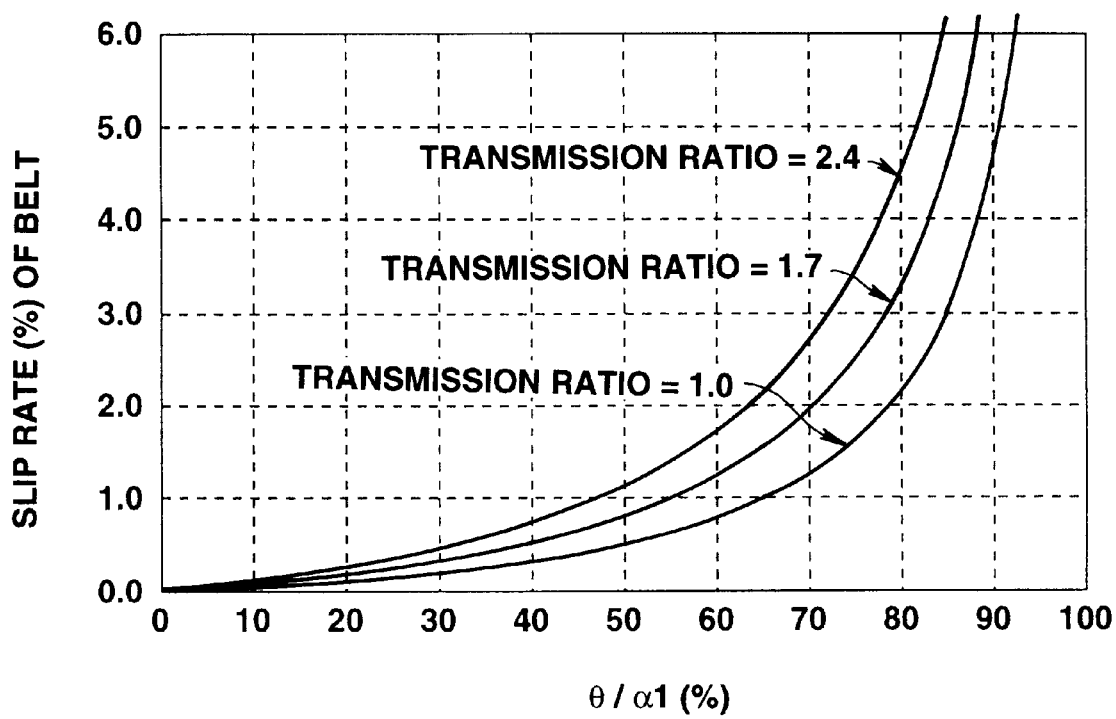
FIG. 11 is a graph showing the relationship between the angular ratio of $\theta/\alpha 1$ and the slip rate in the conventional continuously variable transmission of FIG. 5 in a low (large) transmission ratio range.
Figure 13:
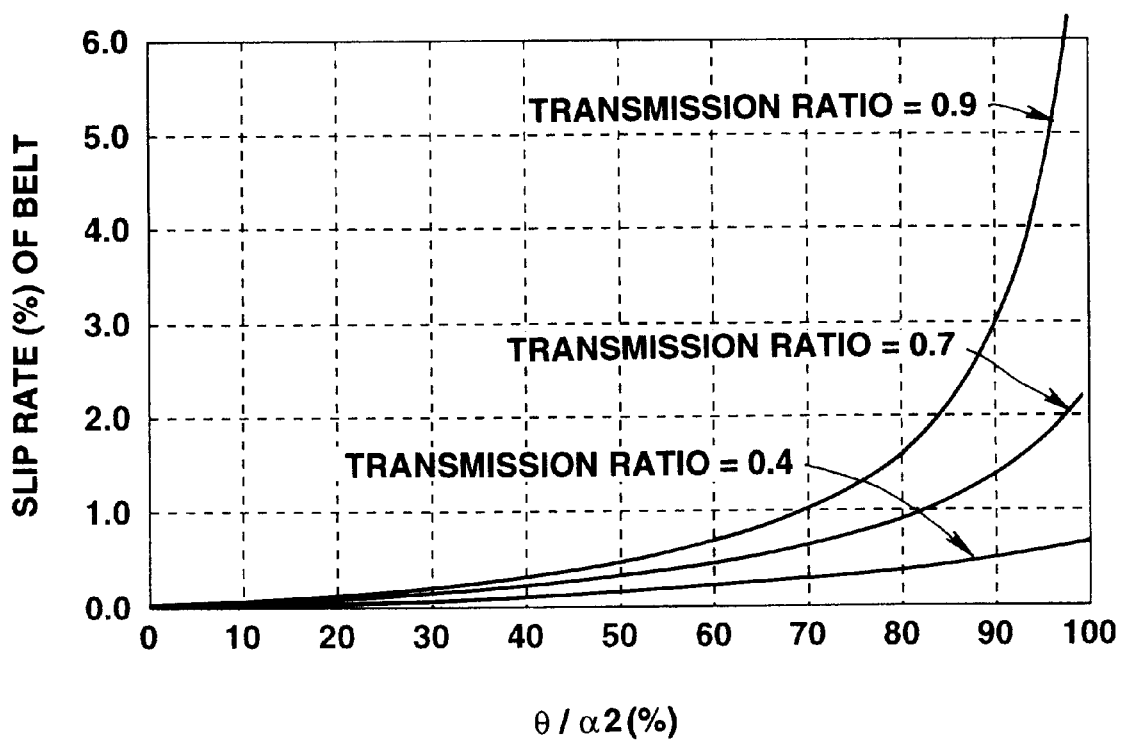
Figure 14:
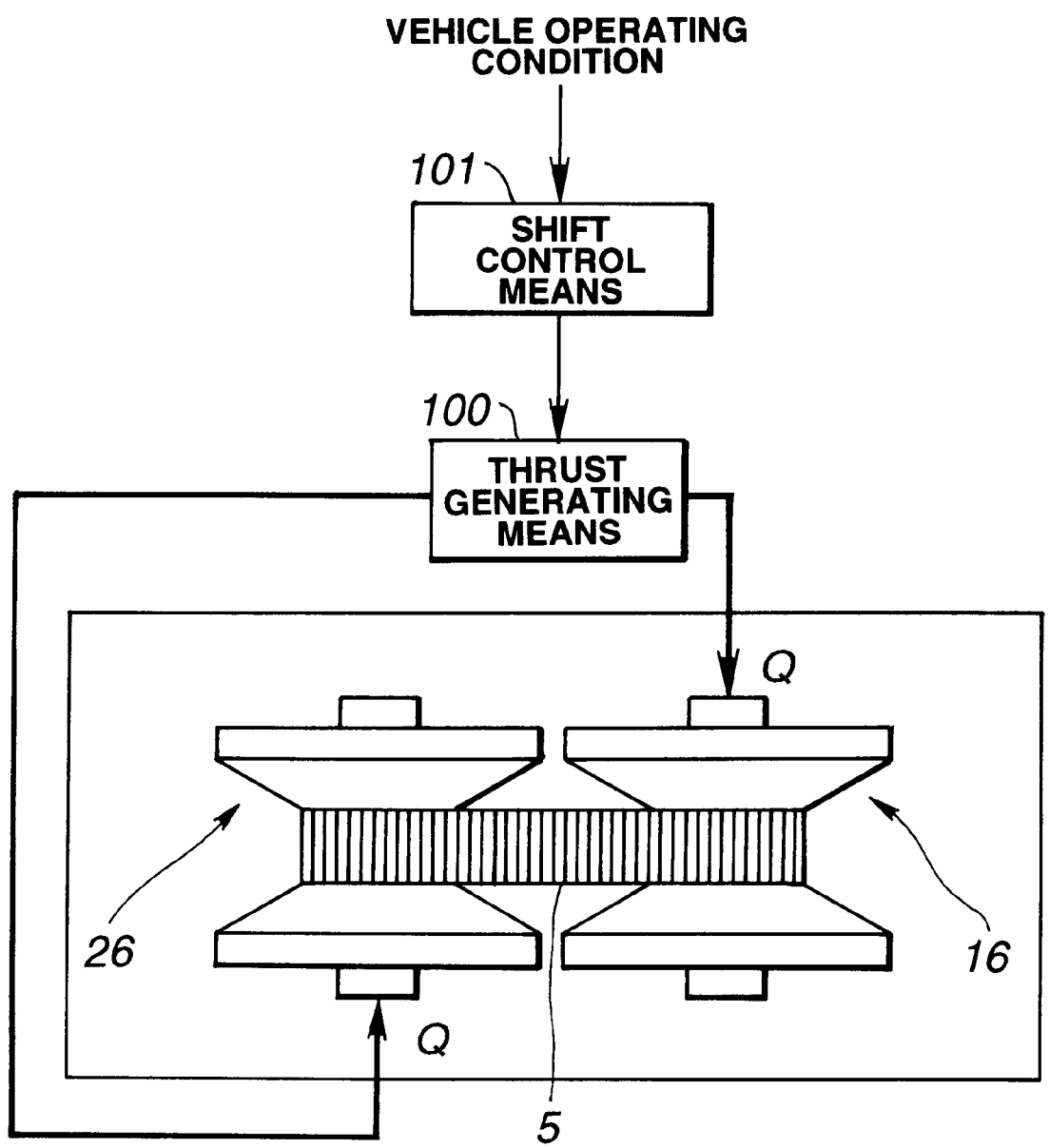

transmission ratio, the essential part being common also to the transmission of FIG. 1;

FIG. 13 is a graph similar to FIG. 11 but showing the relationship between the angular ratio of θ/α1 and the slip rate in the conventional continuously variable transmission of FIG. 5 at a high (small) transmission ratio range; and FIG. 14 is a schematic illustration showing the basic idea of the present invention.

BEST MODE FOR CARRYING OUT THE INVENTION

Figure 6:
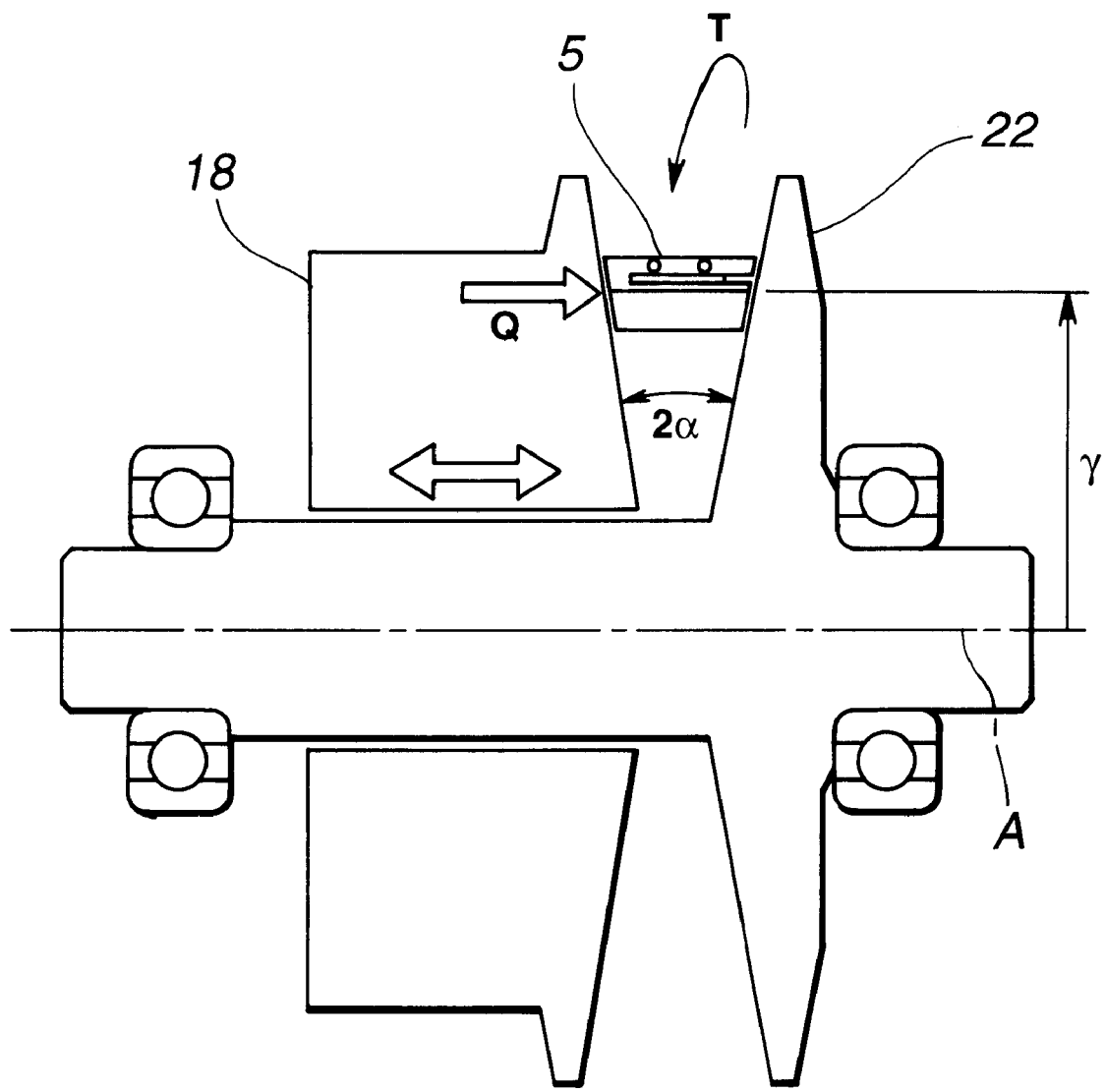
FIG. 6 is a schematic sectional view showing axially movable and fixed counterparts of a drive pulley of the conventional continuously variable transmission of FIG. 5, the structure of FIG. 6 being common also to the transmission of FIG. 1.

To facilitate understanding of the present invention, a brief reference will be made to conventional continuously variable transmission (CVT), depicted in FIGS. 5 and 6. Such a continuously variable transmission is disclosed, for example, in Japanese Patent Publication No. 63-42147. Referring to FIGS. 5 and 6, the continuously variable transmission is shown including a drive pulley 16 to which power is input, and a driven pulley 26 from which power is output. An endless or loop-shaped belt 5 is passed on the drive and driven pulleys 16, 26. The drive pulley 16 includes an axially movable wheel counterpart 18 and an axially fixed wheel counterpart 22 which are rotatable around the axis A. The movable and stationary wheel counterpart 18, 22 are respectively formed with generally frustoconical inner surfaces (no numerals) which face each other to form a pulley groove G therebetween. The pulley groove G is generally V-shaped in cross-section as shown in FIG. 6. The driven pulley 26 is also arranged similarly to the drive pulley 16 and includes an axially movable wheel counterpart and an axially fixed wheel counterpart.

The drive pulley 16 is controlled such that the axial distance between the wheel counterparts 18, 22 continuously changes in accordance with a hydraulic pressure to be axially applied to the movable wheel counterpart 18 so that the width (axial dimension) of the pulley groove G continuously changes. This continuously changes a transmission ratio or speed ratio of the transmission. It will be understood that the hydraulic pressure to be applied to the wheel counterpart 18 of the drive pulley is different from that to the wheel counterpart 18 of the driven pulley 26 at the same time. FIG. 5 shows a passed-on state of the belt 5 at a relatively low gear (large transmission ratio).

Here, a transmitted torque capacity is determined in accordance with a friction produced between the belt 5 and the pulley and therefore the transmitted torque capacity T is given by the following equation Eq. (1):

$$T = 2 \times Q \times \mu \times r \div \cos. \alpha \qquad \text{Eq. (1)}$$

where T is the transmitted torque capacity; Q is the thrust to be applied to the movable wheel counterpart 18 of the pulley (See FIG. 6); $\mu$ is the coefficient of friction between the belt 5 and the pulley; r is the passed-on radius of the belt 5 (the radius of the belt 5 passed on the pulley) (See FIG. 6); and $\alpha$ is the inclined angle of the frustoconical surface of each wheel counterpart of the pulley relative to a plane perpendicular to the axis A (See FIG. 6). The passed-on radius r is a distance between the axis A of the pulley and the radial level of a tapered surface starting point 8c (in FIG. 9) of each element 8 of the belt 5.

Accordingly, the minimum thrust Q necessary to transmit the torque capacity T without causing slip of the belt 5 is determined by the following equation Eq. (2):

$$Q = T \times \cos. \alpha \div (2 \times \mu \times r) \qquad \text{Eq. (2)}$$

If the movable wheel counterpart 18 is always thrust under the minimum necessary thrust Q for the transmitted torque T putting the belt 5 between the facing wheel counterparts 18, 22, the belt 5 can be prevented from producing its slip thereby maintaining a good durability and transmission efficiency of the transmission. In most conventional continuously variable transmissions of the above type, the minimum necessary thrust Q is calculated according to Eq. (2) so as to correspond to the transmission ratio and the transmitted torque capacity T. This thrust Q is multiplied by a predetermined factor (0.2 to 0.3) of safety to obtain a thrust Q under which the movable pulley 18 is thrust toward the fixed pulley 22.

The thrust Q determined upon taking account of the safety factor is given by the following equation Eq. (3):

$$Q = T \times \cos. \alpha \div (2 \times \mu \times r) \times Sf \qquad \text{Eq. (3)}$$

where Sf is the factor of safety (=a constant value ranging from about 1.2 to about 1.3).

Figure 7:
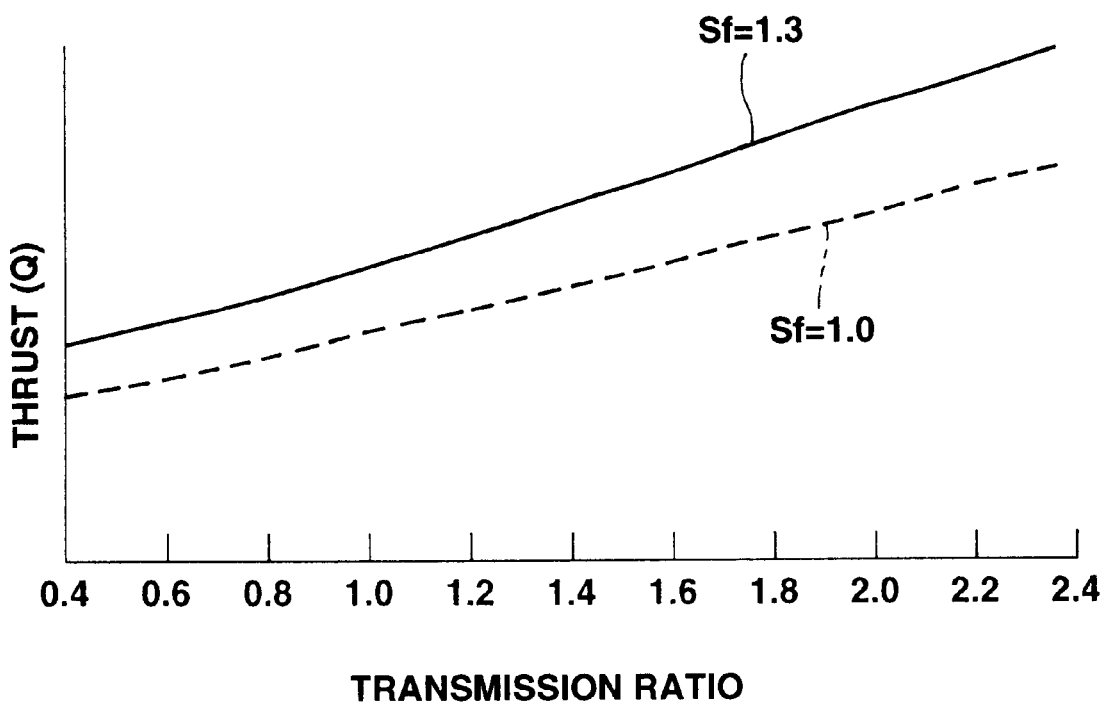
FIG. 7 is a graph showing the relationship between the transmission ratio and the thrust for the pulley, taking account of the safety factor of the thrust, in connection with the conventional continuously variable transmission of FIG. 5.

Thus, the thrust Q for the pulley is set to increase as the transmission ratio increases as shown in FIG. 7.

With reference to FIG. 6, it will be understood that the transmission or speed ratio of the transmission is a value of [the passed-on radius (corresponding to r) of the belt 5 on the driven pulley 26/the passed-on radius r of the belt 5 on the drive pulley 16]. Therefore, the transmission ratio is equal to a value of the revolution speed (corresponding to Nin in FIG. 1) of the drive pulley 16 divided by the revolution speed (corresponding to Nout in FIG. 1) of the driven pulley 26.

Figure 8:
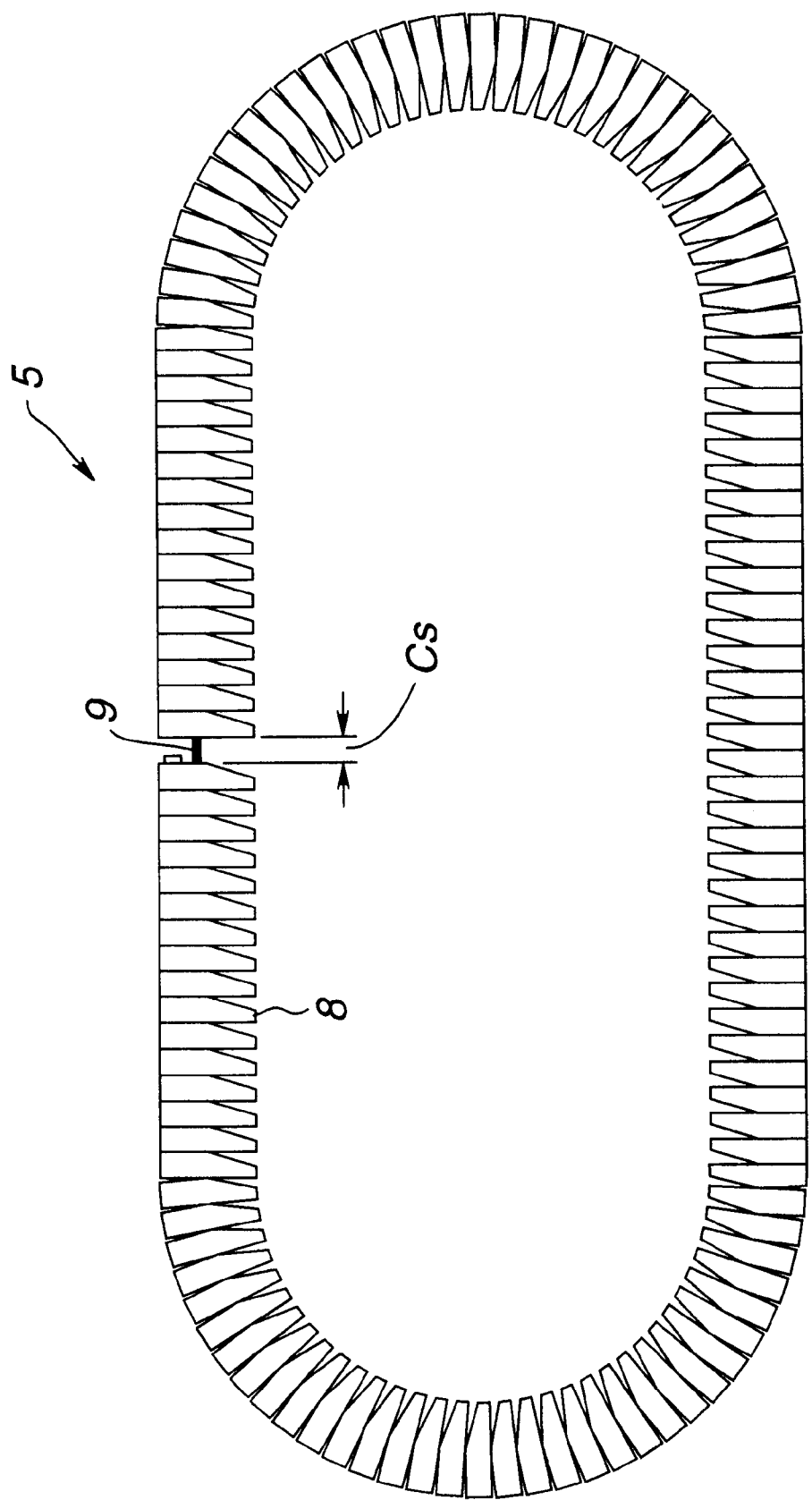
FIG. 8 is a schematic side view of the belt of the conventional continuously variable transmission of FIG. 5, the belt being common also to the transmission of FIG. 1.
Figure 9:
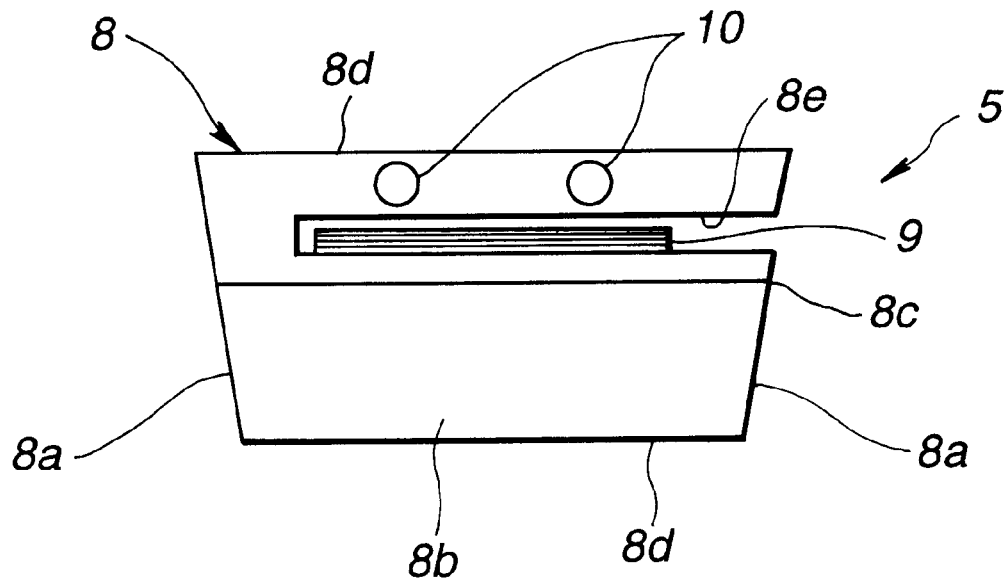
FIG. 9 is a schematic sectional view of the belt of FIG. 5, the belt being common also to the transmission of FIG. 1.
Figure 10:
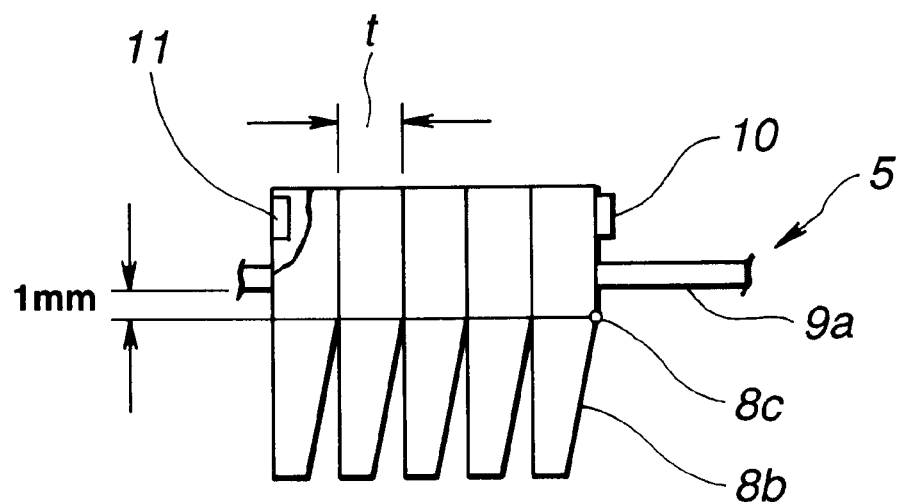
FIG. 10 is a fragmentary side view of the belt of FIG. 8, the belt being common also to the transmission of FIG. 1.

Here, the belt 5 passed on the drive pulley 16 and the driven pulley 26 is one disclosed, for example, in Japanese Patent Provisional Publication No. 55-100443 and illustrated in detail in FIGS. 8 to 10. The belt 5 includes an endless (loop-shaped) steel belt or cylindrical ring 9 which is formed by laminating a plurality of endless steel sheets. A plurality of steel elements 8 are supported on the ring 9 in a manner to be aligned along the periphery of the ring 9 so that the adjacent ones are contactable with each other.

As shown in FIG. 9, each element 8 has two inclined end faces 8a, 8a which are respectively formed at the axially opposite ends of the element 8 relative to the pulley, in which radially opposite end faces 8d, 8d are parallel with each other and extend in the axial direction of the pulley. The inclined faces 8a, 8a are to be brought into slidable contact with the frustoconical inner surfaces of the wheel counterparts of the pulley. Each inclined face 8a is inclined relative to a plane perpendicular to the axis A of the pulley. Each element 8 is further formed with an inclined or tapered surface 8b which extends parallel with the axially opposite ends 8d, 8d and extend from the inclined face 8a to the other inclined face 8a, so that the thickness of each element decreases in the radially inward direction of the pulley. Accordingly, the element 8 is inclinable relative to the adjacent element 8. This tapered surface 8b extends vertically from the tapered surface starting point 8c at the inclined end face 8a to the vertically (bottom) end face 8d in FIG. 9. The tapered surface starting point 8c is separate a predetermined distance from the radially inward surface of a cutout 8e which extends from one of the opposite end faces 8c, 8c to be parallel with the radially opposite ends 8d, 8d. The radially inward surface of the ring 9 is in contact with the radially inward surface of the cutout 8e. The predetermined distance is, for example, about 1 mm or the like.

As shown in FIGS. 9 and 10, each element 8 is formed with a projection 10 and a hole 11 which are respectively located at the opposite surfaces (not numerals) in the peripheral direction of the belt 5. It will be appreciated that the projection 10 and the hole 11 of the adjacent respective elements 8, 8 are to be in engagement with each other so that each element 8 can be kept at a predetermined position in the axial direction of the pulley.

A concrete example of such a belt 5 will be discussed. Assume that the peripheral length of the inner peripheral surface 9a of the ring 9 is 700 mm; the thickness t of the element 8 is 1.8 mm; and the predetermined distance between the radially inward surface of the groove 8e (=the inner peripheral surface 9a of the ring 9) and the tapered surface starting point 8c is 1 mm. In this case, the total number of the elements 8 which can be assembled in the belt 5 is {700–2×1×π (ratio of the circumference of a circle to its diameter)}÷1.8=385.398, in which the number of the elements 8 must be an integer and therefore the total number is 385.

When the elements 8 of the above total number are assembled with the ring 9 to produce the belt 5, an initial clearance Cs of [(700–2×1×π)–385×1.8=0.72 (mm)] is formed as shown in FIG. 8.

It is to be noted that power transmission of the transmission using such a belt 5. including the ring 9 and the plural elements 8 is accomplished under a compression (compressive force) applied to each element 8, while it of a similar transmission using a rubber belt or a chain is accomplished under a tension (tensile force) of the belt or the chain. Therefore, if the belt 5 has the initial clearance Cs, there occur a time at which the compression is applied to the element 8 and another time at which the compression is not applied to the element 8, in which each element 8 must be brought into a transition time (during one rotation of the belt) at which a first state is changed to a second state. At the first state, the clearance is formed between the element 8 and the adjacent element 8 so that no compression is applied to the element 8; and at the second state, no clearance is formed between the element 8 and adjacent element 8 so that the compression is applied to the element 8.

An example of a distribution state of clearance among the elements 8 and a distribution state of the compression at a relatively low gear (large transmission ratio) is illustrated in FIG. 5, in which the belt 5 is passed on the drive and driven pulleys 16, 26 so that a certain torque is transmitted from the drive pulley 16 to the driven pulley 26. In FIG. 5, a shaded portion indicates a range in which the compression is applied, so that the area of this shaded portion represents the magnitude of the compression.

Here, the clearances exist among the elements 8 are generally uniformly distributed on the drive pulley 16 within a range in which no compression is applied to the elements 8, in which the elements 8 with the clearance between the adjacent ones rotate with the drive pulley 16 as a single member.

Now, assume that the thickness of each element 8 is t; and an average clearance between the adjacent elements 8, 8 is Cm; and the drive pulley 16 rotates by a circumferencial distance (at a radial level of the starting point 8c) of t+Cm from the state of FIG. 5, the elements 8 at the shaded portion and within the compression applying range rotates by a circumferential distance of the thickness t of each element 8. Accordingly, the element 8 at the shaded portion will slip relative to the drive pulley 16 by a circumferential distance of [Cm÷(t+Cm)×100 (%)] relative to the circumferential distance of rotation of the drive pulley at the above-mentioned radial level.

It is to be noted that this is a basic mechanism of generation of slip of the belt 5 in the continuously variable transmission of the above-discussed type.

Figure 12:
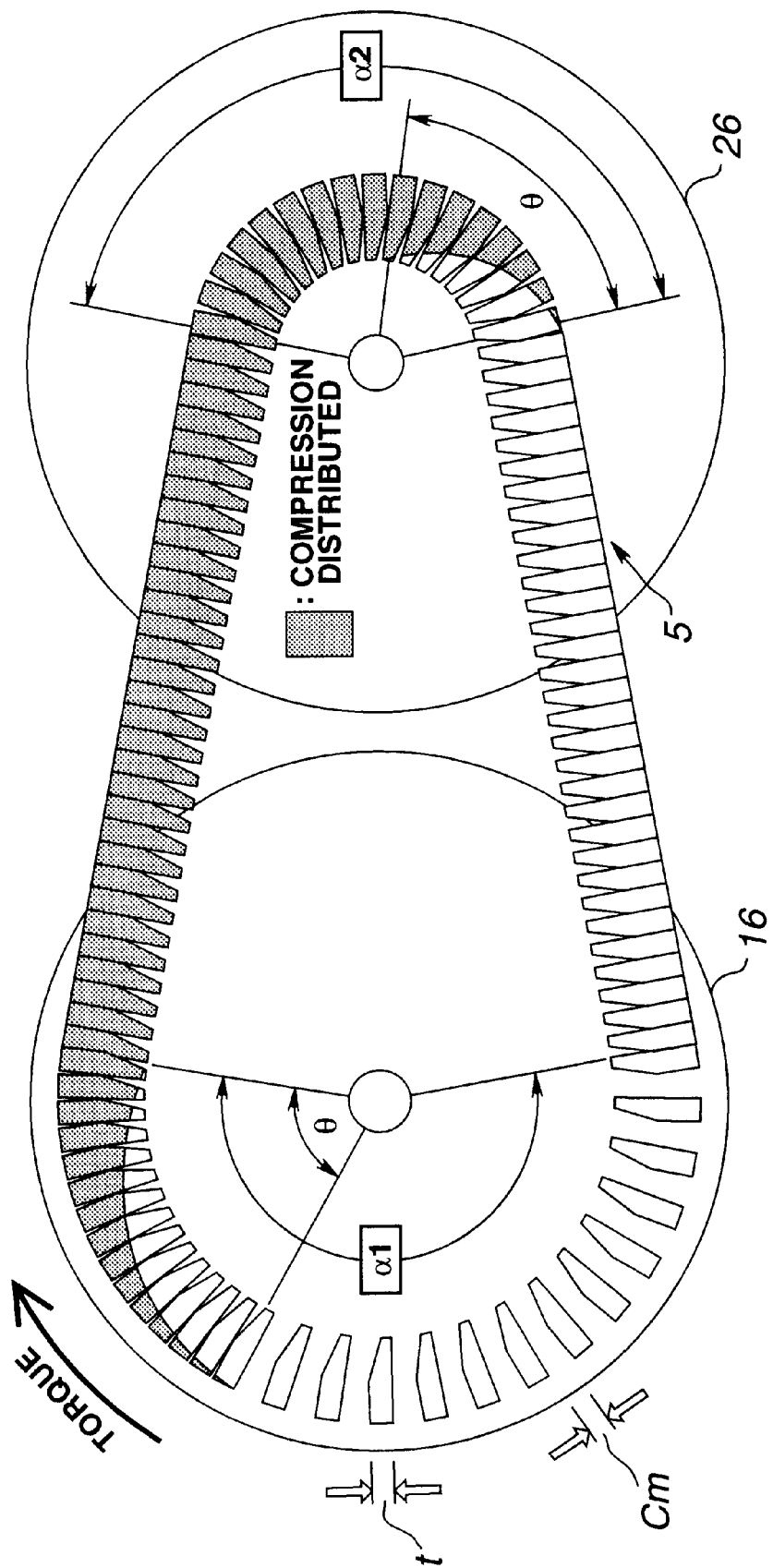
FIG. 12 is a schematic side view similar to FIG. 5 but showing the essential part of the conventional continuously variable transmission of FIG. 5 at a relatively high (small)

An example of the distribution of the clearances among the elements 8 and the distribution of the compression at a relatively high gear (small transmission ratio) is illustrated in FIG. 12, in which the belt 5 is passed on the drive and driven pulleys 16, 26 to transmit a certain torque from the drive pulley 16 to the driven pulley 26. In FIG. 12, the shaded portion indicates a range in which the compression is applied, so that the area of this shaded portion represents the magnitude of the compression, as same as in FIG. 5.

Also at this relatively high gear (small transmission ratio), the slip of the element 8 relative to the drive pulley 16 is made by the distance of [Cm÷(t+Cm)×100 (%)]. At the relatively high gear (small transmission ratio), slip of the element 8 is small as compared with that at the relatively low gear (large transmission ratio) because a passed-on angle α1 of the belt 5 on the drive pulley 16 is larger than that at the relatively low gear (large transmission ratio) in FIG. 5, and the passed-on radius r of the belt 5 is larger than that at the relatively low gear (large transmission ratio) in FIG. 5. The passed-on angle α1 is an angle of a sectoral range (in FIGS. 5 and 12) at which the belt 5 is passed on or in contact with the-drive pulley 16. An angle θ on the drive pulley side in FIGS. 5 and 12 represents a windup angle which is an angle of a sectoral range (in FIGS. 5 and 12) at which the belt 5 is wound up on the drive pulley so that the compression (required for torque transmission) of the element 8 increases or decreases. On the drive pulley side in FIGS. 5 and 12, the compression of the element 8 simply increases. In FIGS. 5 and 12, An angle α2 represents the passed-on angle of the belt 5 in the driven pulley 26, and an angle θ on the driven pulley side in FIG. 5 represents the windup angle at which the belt is wound up on the driven pulley so that the compression (required for torque transmission) of the element 8 increases or decreases. On the driven pulley side in FIGS. 5 and 12, the compression of the element 8 simply decreases.

However, in the above conventional continuously variable transmission, at the relatively low gear (large transmission ratio) as shown in FIG. 5, the windup angle θ required for torque transmission increases as the torque increases, so that the average clearance Cm between the elements 8 increases with an increase in the transmitted torque. As a result, the slip of the elements 8 due to the clearance between the elements 8, 8 increases with the increase in the transmitted torque. In other words, the elements 8 of the belt 5 makes their slip rate of several % to several 10% before the windup angle θ of the belt 5 has reached the passed-on angle α1 of the belt 5 on the drive pulley 16 when the windup angle θ required for torque transmission increases in a condition in which the belt 5 is put between the wheel counterparts of the drive pulley under the thrust Q determined by Eq. (2) and Eq. (3). The slip rate means a percentage (%) of a distance of slip of the belt 5 on the pulley relative to a distance of the peripheral displacement of the pulley at a radial level (of the inclined surface starting point 8c in) at which the belt is passed on the pulley.

Now, assume that there is no clearance between the adjacent elements 8 of the belt 5, the relationship between the windup angle θ of the belt 5 on the drive pulley 16 and the passed-on angle α1 of the belt 5 on the drive pulley 16 is given by the following equation:

$$\theta/\alpha 1 = 100 \ (\%)$$

so that the torque transmission is theoretically possible at 100%. However, on the assumption that the total of the clearances made between adjacent elements of the belt 5 and the extension of the ring 9 is 1 mm, the slip rate (%) is as shown in FIG. 11 in which the slip rate of about 6% is made at θ/α1=85 (%). The degree of making this slip increases with the transmission ratio becomes larger (gear becomes lower). The data of FIG. 11 is on the assumption that the distance between the axes of the drive and driven pulleys 16, 26 is 160 mm.

At the relatively high gear (small transmission ratio) as shown in FIG. 12, the slip rate (%) of the belt 5 becomes as shown in FIG. 13 on the assumption that the total of the clearances made between adjacent elements 8 of the belt 5 and the extension of the ring 9 is 1 mm as same as that in the case of FIGS. 5 and 11. In this case, while the slip of the belt 5 due to clearances between the elements 8 is made similarly to that at the relatively low gear (large transmission ratio), the slip rate (%) becomes low as compared with that at the relatively low gear (large transmission ratio) because the passed-on radius r and the passed-on angle α1 of the belt 5 on the drive pulley 16 are large as compared with those at the relatively low gear (large transmission ratio). As a result, the slip rate of the belt 5 can be suppressed to about 1 to 2% at the transmission ratio of 0.4 or 0.7 even under the thrust Q (for the drive pulley 16) obtained by Eq. (2) and Eq. (3).

As discussed above, at the relatively low (large) transmission ratio, the slip of the belt 5 of several % to several ten % is made, and therefore the slip of the belt 5 cannot be suppressed owing to a varied transmission ratio even though the belt 5 is put between the wheel counterparts of the drive pulley under a predetermined thrust Q. Such slip of the belt 5 will lower the durability and power transmission efficiency of the continuously variable transmission.

In view of the above description of the conventional continuously variable transmission, reference is now made to FIG. 1, wherein a preferred embodiment of the continuously variable transmission (CVT) according to the present invention is illustrated by the reference numeral 17. It is to be noted that the transmission 17 of this embodiment is similar in mechanical structure to the conventional transmission and therefore has a structure as shown in FIGS. 5, 6, 8, 9, 10 and 12. In other words, the structure as shown in FIGS. 5, 6, 8, 9, 10 and 12 is common to both the above-discussed conventional continuously variable transmission and the transmission 17 of this embodiment. Accordingly, the explanation of the transmission 17 of this embodiment will be made using FIGS. 5, 6, 8, 9, 10 and 12, so that the same reference numerals as in the conventional continuously variable transmission are assigned to the same parts and elements in the transmission 17 of this embodiment for the purpose of simplicity of illustration. The continuously variable transmission 17 of this embodiment is for an automotive vehicle and comprises the drive pulley 16 which is drivably connected to an engine. The driven pulley 26 is drivably connected to the drive pulley 16 through the belt 5 passed on the drive and driven pulley 16, 26. The driven pulley 26 is drivingly connected to a wheel axle shaft or power output shaft. The drive pulley 16, the driven pulley 26 and the belt 5 are the same as those of the conventional continuously variable transmission as shown in FIGS. 5, 6 and 8 to 11. Accordingly, the belt 5 includes the endless (loop-shaped) steel belt or cylindrical ring 9 which is formed by laminating a plurality of the endless steel sheets. A plurality of the steel elements 8 are supported on the ring 9 in a manner to be aligned along the periphery of the ring 9 so that the adjacent ones are contactable with each other.

As shown in FIG. 1, the drive pulley 16 includes the axially fixed wheel counterpart 22 which is rotatable with a power input shaft (no numeral) connected to the engine as a single member. The axially movable wheel counterpart 22 is located facing the fixed wheel counterpart 22, which thereby form therebetween the V-shaped (in cross-section) pulley groove G. The movable wheel counterpart 22 is axially displaceable in accordance with a hydraulic pressure to be applied to a drive pulley piston chamber 20 through a shift control valve 2. The driven pulley 26 includes an axially fixed wheel counterpart 30 which is rotatable with an output shaft (no numeral) connected to the wheel axle shaft as a single member. An axially movable wheel counterpart 34 is located facing the fixed wheel counterpart 22 thereby form therebetween the V-shaped (in cross-section) pulley groove G. The movable wheel counterpart 34 is axially displaceable in accordance with a line (hydraulic) pressure to be applied to a driven pulley piston chamber 32 from a hydraulic pressure control unit 3.

The width of the pulley groove G (or the distance between the wheel counterparts 18, 22 of the drive pulley 16 is changed by the shift control valve 2 which controls supply of the pressure of hydraulic oil to the drive pulley piston chamber 20, thus accomplishing a shift control in the transmission 17. More specifically, a solenoid 4 forming part of a hydraulic pressure control unit 3 is controlled under a command from a CVT control unit 1. The thus controlled solenoid 4 controllaby drives the shift control valve 2. The shift control valve 2 and the solenoid 4 are arranged similarly to those disclosed in Japanese Patent Publication No. 63-42147.

The hydraulic pressure control unit 3 includes a line pressure regulator (not shown) which is adapted to regulate the line pressure at a predetermined level. The thus regulated line pressure is supplied to the driven pulley piston chamber 32 and the shift control valve 2 through which the line pressure is supplied to the drive pulley piston chamber 20.

The CVT control unit 1 includes a microcomputer as a main body is arranged to drive the solenoid 4 in accordance with a deviation between a target transmission ratio calculated in accordance with an operating condition of the vehicle provided with the transmission 17 and an actual transmission ratio in such a manner that the target transmission ratio is brought into agreement with the actual transmission ratio.

Figure 2:
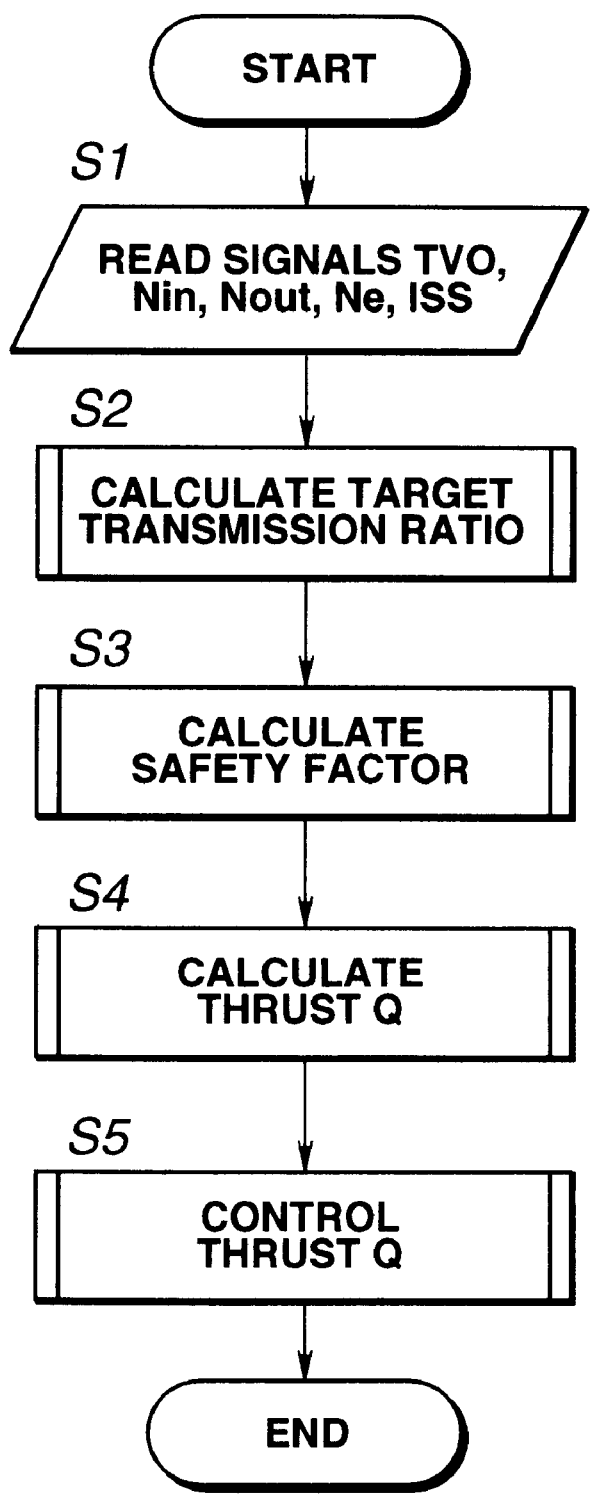
FIG. 2 is a flowchart showing an example of control accomplished by a CVT control unit of the transmission of FIG. 1.

An example of such a shift control accomplished under the action of the CVT control unit 1 will be discussed in detail with reference to a flowchart in FIG. 2.

At a step S1, signals representative of an operating condition of the vehicle provided with the transmission 17 are read. The signals include signals representative of an input revolution speed Nin and an output revolution speed Nout (=a vehicle speed VSP of the vehicle) from the transmission 17, a signal representative of a throttle valve opening degree TVO, and an inhibitor switch signal ISS (representative of a shift mode and the like) from an inhibitor switch 8, and a signal representative of an engine speed Ne from the engine control unit 1. The above input and output revolution speeds Nin and Nout are respectively revolution speeds of the power input and output shafts of the transmission 17. The throttle valve opening degree TVO is an opening degree of a throttle valve (not shown) operated under the depression action of an accelerator pedal by an operator of the vehicle.

At a step S2, a target transmission ratio is calculated in accordance with the above vehicle operating condition read at the step S1, and an actual transmission ratio is determined. Then, the solenoid 4 is controllably driven in accordance with the deviation between the actual transmission ratio and the target transmission ratio thereby controlling the shift control valve 2. The calculation of the target transmission ratio is carried out, for example, according to a shift map or the like which is previously set in accordance with the vehicle speed VSP and the throttle valve opening degree TVO or an accelerator pedal depression degree.

At a step S3, a factor of safety Sf for the thrust Q is calculated in accordance with the target transmission ratio determined at the step S2. The safety factor Sf is for the thrust Q to be applied to the movable wheel counterpart 18, 34 of the drive and driven pulleys 16, 26 so as to put the belt 5 between the movable and fixed wheel counterparts under a suitable pressure.

Figure 3:
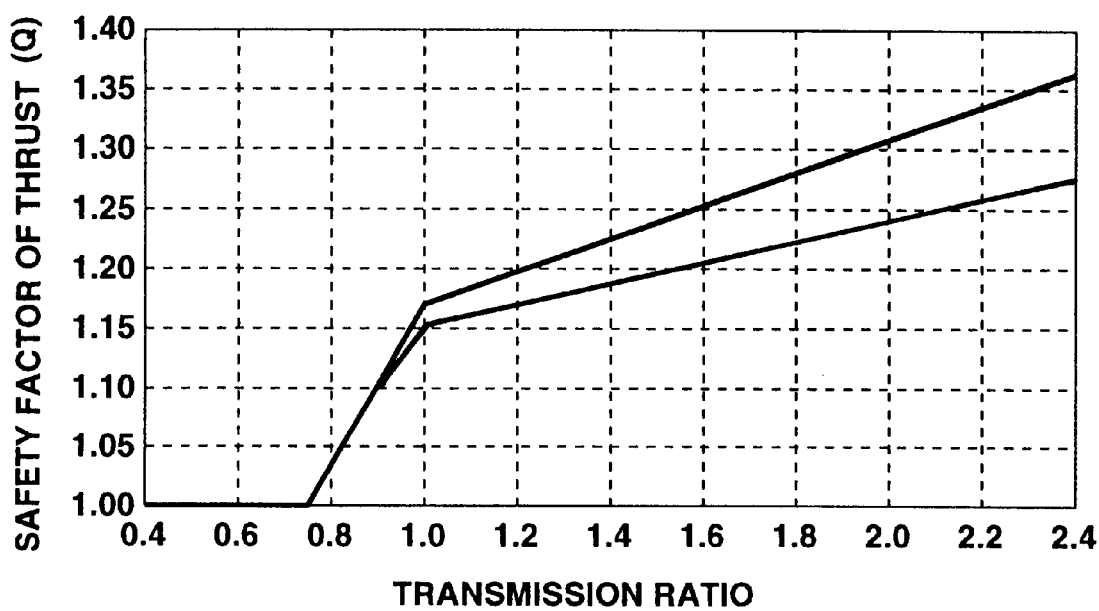
FIG. 3 is a graph showing the relationship between the transmission ratio and the factor of safety of a required thrust for drive and driven pulleys of the transmission of FIG. 1.

The safety factor Sf is set to increase as the transmission ratio increases or becomes lower as shown in FIG. 3. Thus, at this step, the safety factor Sf is obtained in accordance with the target transmission ratio determined at the step S2.

At a step S4, the thrust Q for the pulley is calculated taking account of the safety factor Sf, according to the above-discussed Eq. (3):

$$Q = T \times \cos \alpha + (2 \times \mu \times r) \times Sf \qquad \text{Eq. (3)}$$

where the transmitted torque capacity T, the coefficient of friction $\mu$ and the inclined angle $\alpha$ take respectively predetermined values. The passed-on radius r of the belt 5 takes a value which has been previously set in accordance with the transmission ratio.

Next, at a step S5, the line pressures to be supplied respectively to the drive pulley piston chamber 20 of the drive pulley 16 and the driven pulley piston chamber 32 of the driven pulley 26 are controlled to obtain the respective thrusts Q which are determined in accordance with the variable safety factor Sf. This line pressure control is accomplished by the line pressure regulator in the hydraulic pressure control unit 3. The movable wheel counterpart 18, 34 of the drive and driven pulleys 16, 26 is thrust toward the fixed wheel counterpart 22, 33 under the above thrust Q so as to put the belt 5 between the movable and fixed wheel counterparts under a predetermined pressure.

The processing including the steps S1 to S5 is repeated at predetermined time intervals. As a result, the thrust Q for the pulley increases as the transmission ratio becomes lower (larger). Additionally, concerning a value (Q×r)/T of the relationship among the transmitted torque T, the thrust Q for the pulley and the passed-on radius r of the belt 5, it increases as the transmission ratio becomes larger (gear becomes lower) because the safety factor Sf increases as the transmission ratio becomes larger (gear becomes lower) as shown in FIG. 3 in this embodiment. In contrast, according to the conventional continuously variable transmission, the value of (Q×r)/T is always constant because the safety factor Sf is constant.

Accordingly, even in case that the clearances are produced between the adjacent elements 8 of the belt 5, slip between the elements 8 and the pulley can be effectively prevented from occurrence thereby securing a high durability and a high power transmission efficiency of the continuously variable transmission 17.

Here, setting the safety factor Sf shown in FIG. 3 will be discussed in detail.

If an allowable slip rate (%) is assumed to be 3% in the graphs of FIGS. 11 and 13, unachieved rates at the respective transmission ratios are as follows:

transmission ratio=0.4 unachieved rate=0%
transmission ratio=0.7 unachieved rate=0%
transmission ratio=0.9 unachieved rate=10%
transmission ratio=1.0 unachieved rate=15%
transmission ratio=1.7 unachieved rate=22%
transmission ratio=2.4 unachieved rate=27%

The unachieved rate represents a value of [100 (%)−θ/α1 (%)] at the relatively low gear (large transmission ratio) or of [100 (%)−θ/α2 (%)] at the relatively high gear (small transmission ratio) when the slip rate (%) of the belt 5 is 3%. Therefore, this unachieved rate means a reduction rate of the actual allowable transmitted torque relative to a theoretically transmittable torque in case that no clearance is produced between adjacent elements 8 of the belt 5.

Figure 4:
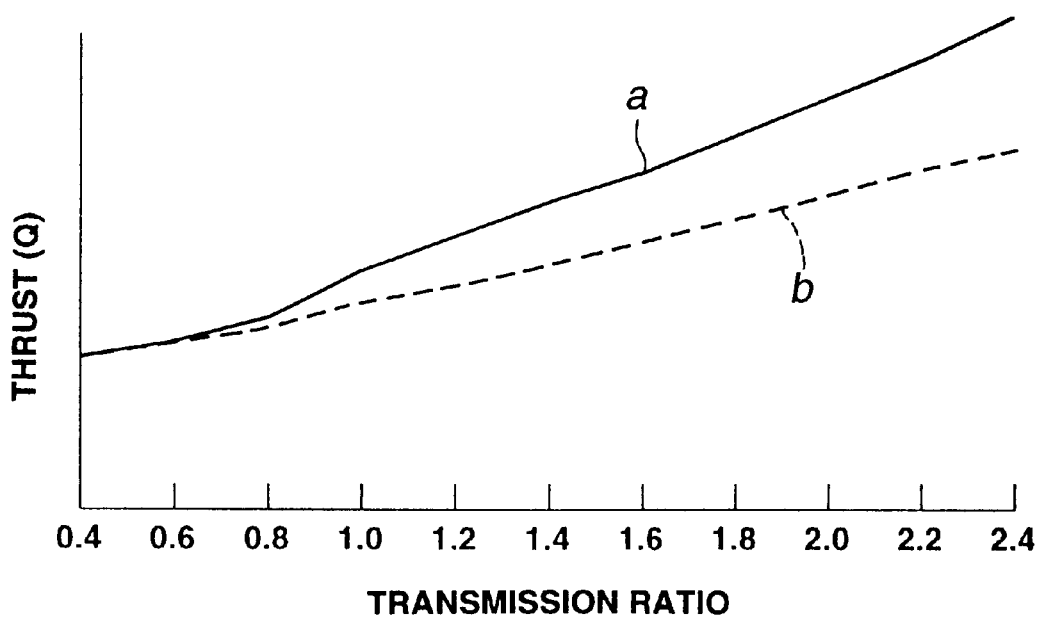
FIG. 4 is a graph showing the transmission ratio and the thrust, in connection with the transmission of FIG. 1 and a conventional continuously variable transmission.

Here, the safety factor Sf of the thrust Q for the pulley is set according to the following equation Eq. (4):

$$Sf = 1 + K \times 100 \qquad \text{Eq. (4)}$$

where K is the unachieved rate (%). Thus, the safety factor Sf in this embodiment is set to increase in accordance with the above unachieved rate K in case that the transmission ratio increases toward a larger side (lower gear) over 0.7. As a result, the value of (Q×r)/T as a design value of the thrust Q for the pulley becomes variable in accordance with the transmission ratio, and therefore the thrust Q (according to this embodiment) of the pulley increases relative to that of the conventional continuously variable transmission (as disclosed in Japanese Patent Publication No. 63-42147) as the transmission ratio increases (gear becomes lower) as shown in FIG. 4 in which a solid curve a indicates the thrust Q in the embodiment of the present invention, while a dotted curve b indicates the thrust Q in the conventional continuously variable transmission. This effectively prevents the slip of the belt 5 from being produced at the relatively low gear (large transmission ratio), and prevents the thrust Q from excessively increasing at the high gear (small transmission ratio).

While the thrust Q to be applied to the movable wheel counterpart 18, 34 of the drive and driven pulleys has been shown and described as being variably controlled under the action of hydraulic pressure in the embodiment, it will be understood that the movable wheel counterpart 18, 34 may be axially moved by other actuators (not shown) so as to vary the thrust Q.

INDUSTRIAL APPLICABILITY

The present invention can effectively improve the durability and the power transmission efficiency of continuously variable transmissions of the type wherein drive and driven pulleys are drivingly connected by a belt passed thereon.

What is claimed is:

1. A continuously variable transmission for a vehicle, comprising:

a drive pulley including first and second wheel counterparts which define therebetween a drive pulley groove, said first wheel counterpart being axially movable in response to an axial thrust to decrease the width of the drive pulley groove;

a driven pulley including first and second wheel counterparts which define therebetween a driven pulley groove, said first wheel counterpart being axially movable in response to an axial thrust to decrease the width of the driven pulley groove;

an annular belt disposed on said drive and driven pulleys to drivingly connect said drive and driven pulleys, said belt being fitted in the drive pulley groove and the driven pulley groove, said belt including a plurality of elements which are aligned along a periphery of said belt; and a control unit that variably controls the width of each of the drive pulley groove and the driven pulley groove in accordance with a transmission ratio based on an operating condition of the vehicle, and sets said axial thrust (Q) of each of the drive and driven pulleys so that a value of (Q×r)/T increases as the transmission ratio becomes larger, wherein T is a transmitted torque and r is a radius of the belt on the respective pulley.

2. A continuously variable transmission as claimed in claim 1, wherein said control unit sets a factor of safety for said axial thrust to increase as the transmission ratio becomes larger.

3. A continuously variable transmission as claimed in claim 2, wherein said control unit sets said safety factor in accordance with a slip rate of said belt, which slip rate is based on the transmission ratio.

4. A continuously variable transmission as claimed in claim 1, wherein the elements of said belt are disposed so that a clearance is formed between the adjacent elements.

5. A continuously variable transmission as claimed in claim 4, wherein said belt includes an endless steel ring on which the elements are movably supported to align along the periphery of said belt.

6. A continuously variable transmission as claimed in claim 4, wherein the first and second wheel counterparts of each of said drive and driven pulleys have respectively first and second generally frustoconical surfaces which are coaxial and face each other to define the respective pulley groove therebetween, wherein each element of said belt has first and second inclined faces located respectively at axially opposite ends of the element, each inclined face being inclined relative to a plane perpendicular to an axis of each of said drive and driven pulleys, the first and second inclined faces slidably contacting the first and second generally frustoconical surfaces of said drive and driven pulleys.

7. A continuously variable transmission as claimed in claim 1, wherein said axial thrust of each of the drive and driven pulleys is generated by hydraulic pressure applied to the respective first wheel counterpart of said drive and driven pulleys.

* * * * *